United States Patent [19]

Geary

[11] 4,259,579

[45] Mar. 31, 1981

[54] WAVEGUIDE LINE SPREAD FUNCTION ANALYZING APPARATUS

[75] Inventor: Joseph M. Geary, Edgewood, N. Mex.

[73] Assignee: The United States of America as represented by the Secretary of the Air Force, Washington, D.C.

[21] Appl. No.: 90,384

[22] Filed: Nov. 1, 1979

[51] Int. Cl.[3] .................... G01T 1/20

[52] U.S. Cl. .................... 250/368; 250/367; 250/320

[58] Field of Search .................... 250/460, 486, 368, 367, 250/320, 323, 363 R

[56] References Cited

U.S. PATENT DOCUMENTS

| | | | |
|---|---|---|---|
| 3,207,899 | 9/1965 | Leishman | 250/368 |
| 3,928,767 | 12/1975 | Röeck | 250/323 |
| 4,132,654 | 1/1979 | Braun | 250/320 |

*Primary Examiner*—Alfred E. Smith
*Assistant Examiner*—Carolyn E. Fields
*Attorney, Agent, or Firm*—Donald J. Singer; William Stepanishen

[57] ABSTRACT

A waveguide line spread function analyzing apparatus utilizing a scanning optical slab waveguide that is sandwiched between two opposing x-ray fluorescent screens to provide access to the fluorescent light which is trapped between the two screens.

5 Claims, 2 Drawing Figures

FIG. 1
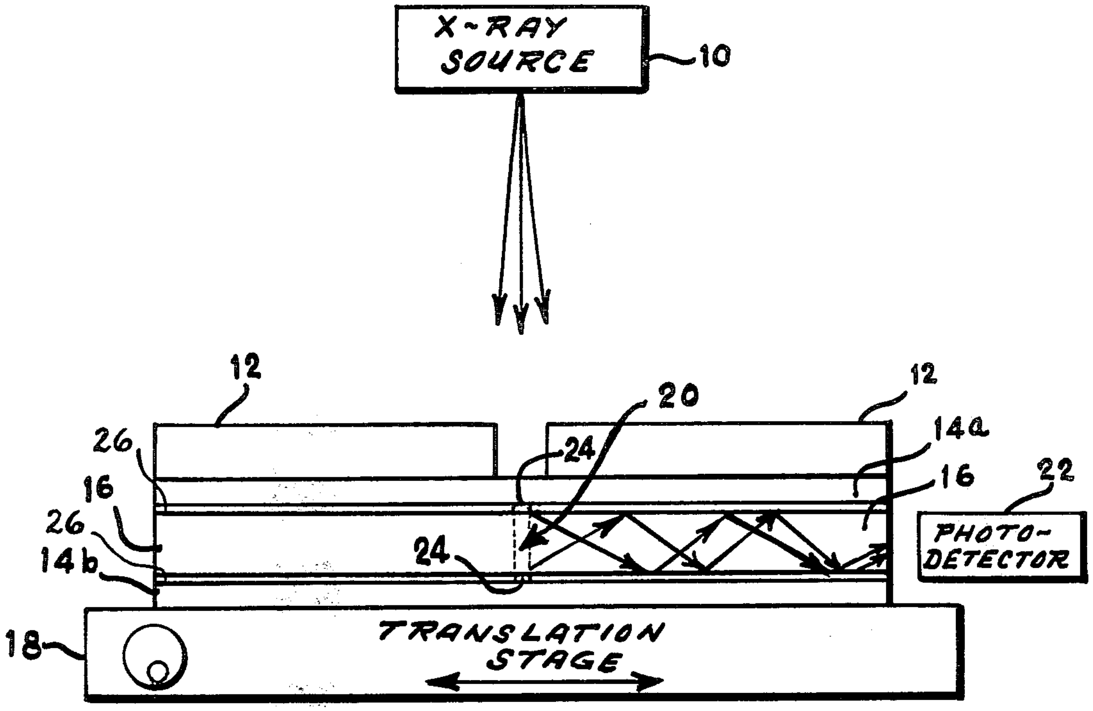
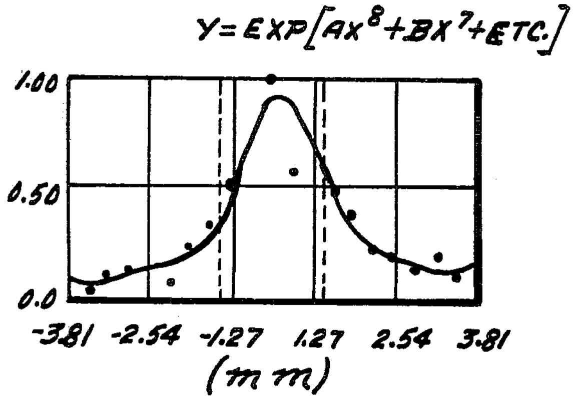
FIG. 2

WAVEGUIDE LINE SPREAD FUNCTION ANALYZING APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to x-ray diagnostic systems, and in particular to a waveguide line spread function analyzing apparatus.

In the prior art, the method commonly utilized to measure the line spread function of x-ray diagnostic screen has made use of photographic film. This method evolved as the preferred method since most medical radiographs are usually made with a double emulsion film, sandwiched between two opposing x-ray fluorescent screens. Furthermore, the use of film provides the easiest way to access the fluorescent light trapped between the two screens.

This method of utilizing radiographic film and extracting the requisite information presents a complex problem. This is due mainly to the fact that the film is nonlinear and has a limited dynamic range. This necessitates two different exposures of the sandwiched film to test slit: one exposure to capture the peak of the impulse response within the film's linear range; the other to register its wings while the peak saturates the film. In conjunction with recording, the impulse response or accurate sensito-metric strip must be generated. This is normally accomplished via the inverse-square law, with corrections for air-path absorption.

Once all necessary exposures have been obtained, the film must be carefully processed. Controlled development is essential in studies where repeatable results are needed to more accurate measurements. Such close monitoring of the film processing condition is a difficult and tedious process. Furthermore, data reduction requires the use of a microdensitometer to read the negatives of the impulse responses and sensito-metric strip, and a computer for curve fitting, splicing, and smoothing in order to obtain an accurate exposure profile. In addition, corrections are needed for adjacency effects, direct grain exposure by x-rays, chemical spread function, specular density, and crossover. With due precaution and patience, it is possible to obtain accurate line spread function results for x-ray intensifying screens using film. However, the present invention utilizes a thick slab optical waveguide instead of film thereby providing a faster, more direct method of obtaining line spread function measurements of sandwiched screens.

SUMMARY OF THE INVENTION

The present invention utilizes an x-ray source to irradiate a narrow slit in a lead shield. The slit in the lead shield allows the x-rays to enter the analyzing sandwich apparatus which comprises an optical slab waveguide between two opposing intensifying screens. The analyzing sandwich may be mounted on a translation stage to permit the sandwich to be scanned past the slit in the lead shield. The fluorescent light which is emitted from the ends of the optical waveguide may be applied to a photo-detector for measurement.

These and other advantages, objects and features of the invention will become more apparent after considering the following description taken in conjunction with the illustrative embodiment in the accompanying drawings.

It is one object of the present invention, therefore, to provide an improved waveguide line spread function analyzing apparatus.

It is another object of the invention to provide an improved waveguide line spread function analyzing apparatus for obtaining the line spread function of fluorescent screens.

It is another object of the invention to provide an improved waveguide line spread function analyzing apparatus utilizing a scanning optical slab waveguide.

It is still another object of the invention to provide an improved waveguide line spread function analyzing apparatus for coupling screen-fluorescent light to a photo-detector for measurement.

These and other advantages, objects and features of the invention will become more apparent after considering the following description taken in conjunction with the illustrative embodiment in the accompanying drawings.

BRIEF DESCRIPTION OF THE DRAWINGS

FIG. 1 is a schematic diagram of the waveguide line spread function analyzing apparatus in accordance with the present invention, and, FIG. 2 is a graphical representation of the line spread function of a fluorescent screen using a 3 mm slit.

DESCRIPTION OF THE PREFERRED EMBODIMENT

Referring now to FIG. 1, there is shown a schematic diagram of the waveguide line spread function analyzing apparatus. An x-ray source 10 irradiates a narrow slit formed by the lead shield 12. The slit width is small enough so that an impulse response from the screens is essentially generated. Immediately adjacent to and below the lead shield 12 lies the analyzing sandwich which comprises a slab waveguide 16 between two opposing intensifying screens 14*a*, 14*b*. The analyzing sandwich is shown mounted on a translation stage 18 which permits the analyzing sandwich to be scanned in the directions indicated by the arrows. The surfaces of the guide 16 are opaque, except for a thin strip 24 in the very center on both sides adjacent to the intensifying screens 14*a*, *b*. This is the only region in which light can enter the guide 16, i.e., there are two windows or sampling-apertures directly, opposite each other to admit into the guide fluorescent light from the activated region of either screen 14*a*, *b*. It may be noted that the window width must be much smaller than the impulse-response width of the screens 14*a*, *b*. Between the two windows and lying within the guide 16 is the light-scattering region 20 shown in dashed lines for clarity. This is essential to couple the incoming fluorescent light from the screens 14*a*, *b* into the waveguide 16 where it is channeled out the sides to a photo-detector 22. The analyzing sandwich is then translated or scanned past the lead slit. It may be noted that the fluorescing regions in the screens remain essentially stationary relative to the lead slit but the sampling aperture scans through this region, the amount of light admitted being a fraction of lateral position. The light that is emitted from the sides of the waveguide 16 to the detector is directly related to the impulse response of the screens, which represents the line spread function of sandwiched screens 14*a*, *b*. In the present example, the waveguide 16 was fabricated from a single microscope cover slip (approximately 150 μm thick) which was coated with a thin layer 26 of opaque plastic. The lower index of the plastic enhances the guiding properties of the slab. The sampling apertures are established by simply scratching a thin straight line in the plastic.

Turning now to FIG. 2, there is shown the graphical representation of the response of the waveguide line spread function analyzing apparatus, wherein the response is shown as a function of the scan. The response was achieved when the waveguide aparatus was tested employing microscope cover slips, 150 μm thick, as the slab guides. After coating the surfaces with an opaque flat-black paint, the thickness was brought up to approximately 225 μm which is about 25 μm thicker than double emulsion radiographic film. The window and scattering region in the following tests were constructed by taking two slips and butting their rough edges fairly close together (approximately a 150 μm width). The rough edges also served as the scatterer.

The slips were carefully sandwiched and compressed for good contact between two calcium-tungstate fluoroescent screens, and the combination mounted on a translating stage. A GE x-ray source having a 1 mm focal spot was operated in the radiographic (pulsed) mode at 84 kVp and 100 mA for a 2-s pulse. The separation between source and lead slit was 42 cm. The width of the lead slit in the present example was 3 mm. An EG&G 580 visible radiometer was employed and operated in its own power (current) mode. No diffuser was used on the detector head which was placed 0.5 m from the nearest light-emitting edge. A maximum peak current of 5.60 μA was detected when the guide-sampling aperture was centered in the field of view of the lead slit. This reading was obtained on the radiometer's least sensitive range setting. Thus, there is shown in FIG. 2 that the data points which are shown by the dots have been fitted with an eighth-degree exponential. Each point represents the peak irradiance values averaged over three readings at each lateral position of the sampling aperture. The data have been normalized relative to 56.60 μA (the reading obtained at the center of the lead slit). The set of vertical lines represents the 3 mm-wide window of the lead slit.

Although the invention has been described with reference to a particular embodiment, it will be understood to those skilled in the art that the invention is capable of a variety of alternative embodiments. For example, the lead shield could be mounted fixedly or moveably as shown.

What is claimed is:

1. A waveguide line spread function analyzing apparatus comprising in combination:

means for generating x-rays, said x-ray means having a narrow focal spot, a lead shield having a slit therein, said slit having a predetermined width, a slab optical waveguide having a first and second window therein, said first and second window being directly opposite each other, said first and second windows having the same dimensions, said first and second windows having a window width much smaller than said slit, a first and second intensifying screen positioned on said slab optical waveguide so as to form a sandwich, said first intensifying screen being on top of said waveguide and said second intensifying screen being on the bottom of said waveguide, said first and second window being optically aligned with said slit and said x-ray means, said x-ray means irradiating said first and second intensifying screens through said slit, said first and second intensifying screens generating fluorescent light in response to said x-rays, said fluorescent light entering said waveguide through said first and second windows, and, a photodetector positioned at one end of said waveguide to receive said fluorescent light that was channeled through said waveguide, said photodetector measuring the intensity of said fluorescent light.

2. A waveguide line spread function analyzing apparatus as described in claim 1 further including a translation stage for scanning back and forth horizontally, said translation stage supporting said sandwich, said translation stage scanning said sandwich and thereby said first and second window past said slit to establish the line spread function of said first and second intensifying screens.

3. A waveguide line spread function analysing apparatus as described in claim 1 wherein said slab optical waveguide comprises a single microscope cover slip that is coated with a thin layer of opaque plastic.

4. A waveguide line spread function analyzing apparatus as described in claim 1 wherein said first and second intensifying screens each comprise a calcium-tungstate fluorescent screen.

5. A waveguide line spread function analyzing apparatus as described in claim 3 wherein said microscope cover slip is 150 μm thick.

* * * * *